Sept. 4, 1956 M. C. THOMPSON, JR 2,761,971
CRYSTAL-CONTROLLED BLOCKING OSCILLATORS
Filed Aug. 26, 1953
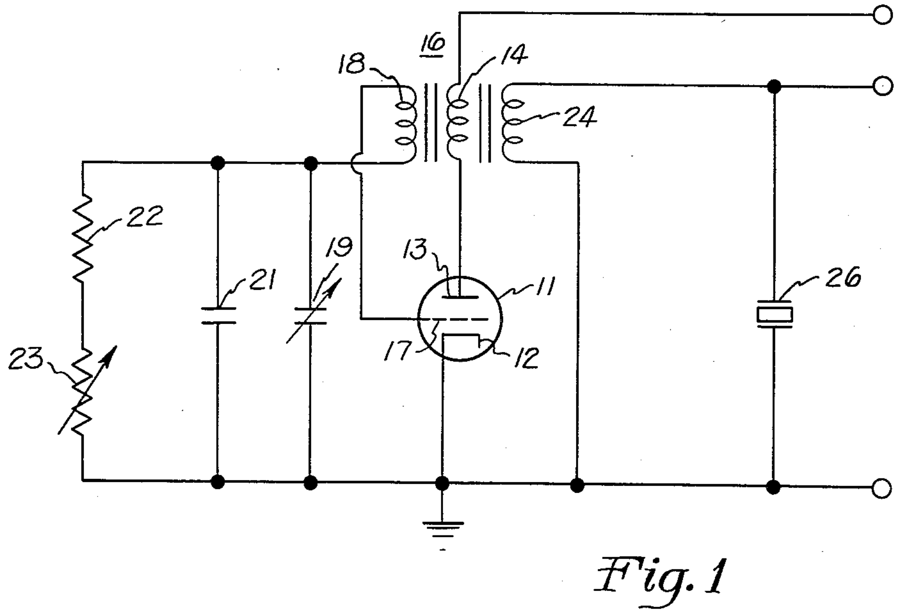
Fig. 1
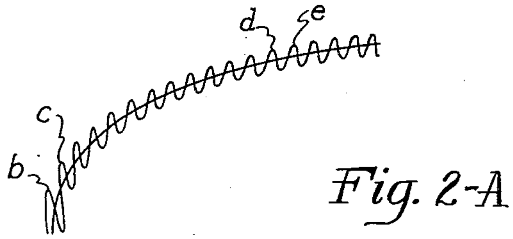
Fig. 2-A
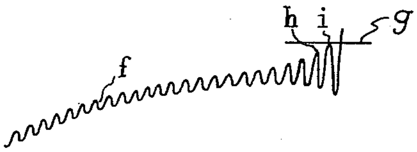
Fig. 2-B
INVENTOR
Moody C. Thompson, Jr.
BY Howard L. Rose
AGENT United States Patent Office 2,761,971

Patented Sept. 4, 1956

2,761,971

CRYSTAL-CONTROLLED BLOCKING OSCILLATORS

Moody C. Thompson, Jr., Colorado Springs, Colo., assignor to the United States of America as represented by the Secretary of Commerce Application August 26, 1953, Serial No. 376,770

4 Claims. (Cl. 250—36)

(Granted under Title 35, U. S. Code (1952), sec. 266)

The invention described herein may be manufactured and used by or for the Government of the United States for governmental purposes without the payment to me of any royalty thereon in accordance with the provisions of 35 United States Code (1952) Section 266.

The present invention relates to blocking oscillators and in particular to crystal-controlled blocking oscillators. Blocking oscillators are well known in the prior art, there being in general two types. The first type of blocking oscillator known to the prior art is crystal-controlled and has been used very sparingly in recent years because of inherent difficulties in its operation. An example of this type of oscillator is found in the patent to Marrison, No. 1,919,795. The difficulty with these oscillators lies in the fact that the division ratios obtainable are very small; that is, it is not possible to produce frequencies which vary greatly from the basic frequency of the crystal. An example of this limitation is found in the Marrison patent where, when it is desired to divide the crystal frequency by as small a factor as 6, it is recommended that two stages of blocking oscillators be used; one dividing by 3 and the other dividing by 2.

The second type of blocking oscillator known to the prior art is not crystal-controlled. This type has the advantage that it has a fairly wide frequency band over which it can oscillate, but on the other hand the output frequency will vary greatly with changes in the circuit parameters.

It is therefore the primary object of the present invention to provide a crystal-controlled blocking oscillator which is capable of producing division ratios as great as 10,000.

Another object of the present invention is to provide a crystal-controlled blocking oscillator which requires only very minor modifications in the types of blocking oscillators now in current use.

Another object of the present invention is to provide a crystal-controlled blocking oscillator which maintains its output frequency with a high degree of constancy.

Another object of the present invention is to provide a crystal-controlled blocking oscillator in which the output of the oscillator is synchronized with the basic frequency of the crystal.

In accordance with the present invention there is provided a crystal-controlled blocking oscillator which in its essentials differs from the oscillator of the Marrison patent only in that a pulse transformer is used in place of the standard transformer shown by Marrison. The use of the pulse transformer has caused the circuit to operate in an entirely different manner and in addition to produce an entirely new and unobvious result; namely, that division ratios as high as 10,000 are obtainable. This modification causes the blocking oscillator frequency to be synchronized with the crystal frequency even at very high division ratios. This is accomplished in the following manner: The tight coupling of the pulse transformer causes the crystal to act in conjunction with the tube as a crystal oscillator. Secondly, the feedback circuit in the grid of the tube of the oscillator now operates as a low-Q, amplitude-variable oscillator whose frequency is locked on some harmonic, or sub-harmonic, of the crystal frequency. Then by merely varying the decay time of the condenser in the grid circuit of the oscillator tube, it is possible to obtain very large division ratios, which, however, are locked with respect to the crystal frequency.

Other uses and advantages of the invention will become apparent upon reference to the specification and drawings.

Figure 1 is a circuit diagram of the preferred form of the present invention.

Figure 2 is a series of reproductions of pictures taken from the face of a cathode-ray oscillograph showing the various wave forms obtained on the grid of the oscillator tube.

Referring to Figure 1, the tube 11 has its cathode 12 grounded, and its plate 13 connected through one winding 14 of the pulse transformer 16 to the B+ supply. The grid 17 of the tube is connected through another winding 18 of the pulse transformer and through the variable capacitor 19 to ground. The capacitor 19 is shunted by the fixed capacitor 21 and the series combination of the fixed resistor 22 and variable resistor 23. A third winding 24 of the transformer 16 has one terminal connected to ground and the other terminal connected through the crystal 26 to ground.

Assuming initially that the blocking oscillator has just fired, the grid 17 is instantaneously driven very highly positive and then very sharply negative. The negative bias on the grid shuts off the tube, and this negative charge is stored in the capacitors 19 and 21, thereby maintaining the tube in the biased-off condition. However, the capacitors gradually discharge through the resistors 22 and 23, and the potential on the grid 17 rises along the exponential discharge curve of the capacitors. When the grid has reached a potential at which the tube can again fire, a large pulse is given out by the oscillator, the grid again being instantaneously driven very highly positive and then very highly negative. This is the normal operation of non-crystal-controlled blocking oscillators and is well known in the prior art. In the prior art crystal-controlled blocking oscillators the large output pulse caused the crystal to ring at its basic frequency, the ringing voltage being superposed on the exponential timing wave form on the grid of the tube. This alone served to synchronize the frequency of the blocking oscillator at low division ratios. The reason for this can be seen by referring to Figure 2A. If low division ratios are used, then firing will occur while the voltage is increasing along the steep portion of the exponential curve *a*. With the ringing voltage of the crystal superposed on this curve, it is obvious that firing will occur during one of the positive peaks of the ringing voltage. Since the voltage difference between peaks *b* and *c* is comparatively large, the circuit can easily differentiate between the two and lock on the one desired, thereby providing frequency stabilization. However, if the division ratio is high, by the time the grid reaches critical firing potential, the timing wave form is so flat and the voltage difference between the peaks—for instance peaks *d* and *e*—is so small that it is impossible for all the circuit parameters to remain so constant that the circuit will consistently respond to the correct peak.

In the above circuit the crystal was caused to ring by the large output pulse, but the crystal did not combine with the tube of the circuit to form a crystal oscillator. In the present invention, owing to the very tight coupling of the pulse transformer, the crystal and tube do combine to form an oscillator which will oscillate for a brief period before the firing of the blocking oscillator. Initially the crystal rings, as it does in the oscillator described above, and the tube being biased to almost complete cut-off by the large negative charge stored across the capacitors 19 and 21, the tube cannot cooperate with the crystal to produce a true oscillator. However, since no tube is cut off 100 percent by the normal biases which are applied to the grid, the tube will begin to conduct to a very small extent as the bias on the grid rises. That is, before the tube actually fires and causes the blocking oscillator to produce an output pulse, there will be some conduction through the tube, which conduction is sufficient to cause the crystal and tube to act as an oscillator. These oscillations will continue until the tube again fires and are superposed on the grid voltage. In addition to the crystal oscillator the winding 18 in conjunction with the tube and feedback circuit form a second oscillator, the winding 18 and its stray capacitances acting as a tank circuit for this oscillator. This low-Q oscillator produces what will hereinafter be called the characteristic oscillation of the blocking oscillator circuit. Since the Q of the tank circuit is very low, pulse transformers necessarily having low-Q windings, this oscillator is amplitude-unstable, and the amplitude of the oscillations rise sharply as the capacitor discharges. This is due to the steady increase of the transconductance of the tube in conjunction with the low Q of the tank circuit, the increase in transconductance resulting from the decrease of bias on the grid of the tube as the capacitor discharges. This circuit oscillates at a characteristic frequency which is determined by the resonant frequency of the low-Q tank and breaks into oscillation prior to actual firing of the tube, this voltage also being superposed on the grid voltage. These oscillations of the low-Q circuit are synchronized with the crystal oscillations, thereby providing for frequency stability of this oscillator. However, as pointed out above, the low-Q oscillator is amplitude-unstable, the amplitude of the oscillatory voltage increasing by as much as several volts per cycle.

As a result of the above, the grid 17 of the tube has impressed upon it three distinct voltages, the gradual increase of voltage as the capacitor discharges, the oscillatory voltage of the crystal oscillator, and the oscillatory voltage of the low-Q oscillator. In other words, there is a regenerative build-up of an oscillatory voltage at a frequency which is characteristic of the particular circuit, which voltage is superposed on a timing wave form of the grid and serves to trigger the transition. At the same time the characteristic oscillation is synchronized with the oscillations of the crystal, which in conjunction with the tube acts briefly as a crystal oscillator once each cycle of relaxation.

The high degree of stability of the frequency of the blocking oscillator of the present invention even at high division ratios is due to the increase of amplitude of the characteristic frequency cycle by cycle. This can be shown by referring to Figure 2*b*. In this signal the overall shape of the wave is controlled by the discharge or exponential curve of the capacitor. Superposed on the capacitor discharge wave is the characteristic frequency voltage of the low-Q oscillator which, as can be seen, builds up cycle by cycle. The line *g* represents the grid potential at which the tube will fire, thereby producing an output pulse from the blocking oscillator. It will be noted that the magnitude of each positive peak, such as *h* and *i*, increases considerably over the prior positive peak and therefore makes it possible to differentiate easily between one pulse and the next succeeding or prior pulse even when operating on the flat portion of the timing wave form. Therefore, the present invention eliminates the requirement of differentiating between two pulses of very nearly identical amplitudes and provides a series of pulses, the amplitudes of which are very definitely different. This operation is the direct result of the use of the pulse transformer, which provides tight enough coupling for there to be created two oscillators which are independent of and which, in fact, fix the frequency of oscillation of the blocking oscillator. There is a first oscillator which includes the tube and the crystal and a second oscillator which includes one of the windings of the pulse transformer and the tube. These two oscillators were not present in the Marrison patent and are responsible for the very great division ratios which are obtainable by means of the present invention.

The frequency of the blocking oscillator is controlled by varying the discharge time of the condenser 19. Rough adjustments are made by varying the value of resistor 23, while fine adjustments are made by adjusting the value of condenser 19. In making an initial adjustment of the pulse repetition frequency of the blocking oscillator, the values of R or C are varied until the pulse repetition frequency "locks" into synchronism with a harmonic or subharmonic of the crystal frequency. Further variation in R or C results in "pulling" of the pulse repetition frequency by a very small fraction until synchronism is lost. As R or C are further varied, the pulse repetition frequency will in the same way lock successively on other succeeding subharmonics or harmonics of the crystal frequency.

The oscillator was found to have a high degree of frequency stability even at large division ratios. With a B supply of 300 volts and a division ratio of 10,000, it required a variation of 3 volts in the B supply to pull the oscillator out of synchronism. This constituted a 1 percent variation in plate voltage which is comparatively large considering the fact that standard electronic voltage regulators will hold the B supply to a variation of only 0.1 percent.

A crystal-controlled blocking oscillator utilizing a transistor gives results qualitatively similar to one using a conventional vacuum tube. The conventional circuit is modified by connecting a low-frequency crystal across the collector winding.

It will be apparent that the embodiments shown are only exemplary and that various modifications can be made in construction and arrangement within the scope of my invention as defined in the appended claims.

What is claimed is:

1. A crystal-controlled blocking oscillator, comprising a vacuum tube having a grid circuit and a plate circuit, a pulse transformer having at least two windings forming a regenerative feedback circuit connected from the plate circuit to the grid circuit of said tube, said tube and said regenerative feedback circuit connected to form a low-Q sinusoidal oscillator having a characteristic frequency distinct from the frequency of the blocking oscillator, a piezoelectric crystal, means connecting said crystal across a winding of said transformer to form a crystal oscillator, and means providing sufficient regenerative feedback to cause said low-Q oscillator and said crystal oscillator to start to oscillate before normal conduction of the tube occurs.

2. A crystal-controlled blocking oscillator, which comprises a vacuum tube having a grid circuit and a plate circuit, a pulse transformer having at least two windings forming a regenerative feedback circuit connected between said plate and said grid circuits, a capacitor connected in said grid circuit for controlling the bias on the grid of said tube, means connecting said tube and said feedback circuit to provide a low-Q sinusoidal oscillator having a characteristic frequency different from the blocking oscillator frequency, a piezoelectric crystal, means connecting said crystal across a winding of said transformer to provide a crystal oscillator, the oscillatory voltage of said low-Q oscillator and said crystal oscillator being superposed on the grid bias voltage.

3. A subharmonic crystal-controlled blocking oscillator comprising, an electron tube having an anode, a cathode and a control grid, a closely coupled pulse transformer having a first winding connecting said plate to the positive side of a power supply, a low Q resonant circuit including a second winding of said transformer and the stray capacitance of said second winding connected at one end to said grid, the other end of said low Q circuit connected to the other side of said power supply through a variable capacitor connected in parallel with a variable resistor, said pulse transformer having a third winding connected at one end to said other side of said power supply and to said cathode, and a high Q crystal connected across said third winding, the output of said oscillator being taken across said crystal.

4. A crystal-controlled blocking oscillator, comprising a vacuum tube having a grid circuit and a plate circuit, a pulse transformer having at least three windings, one of said windings being connected in the plate circuit of said tube, a capacitor, another of said windings and said capacitor being connected in the grid circuit of said tube, said last-mentioned winding being connected in said circuit so as to provide regenerative feedback to the grid of said tube, the third winding coupled to the plate circuit of said blocking oscillator, and a piezoelectric crystal connected across said third winding.

References Cited in the file of this patent

UNITED STATES PATENTS

| | | |
|---|---|---|
| 1,733,614 | Marrison | Oct. 29, 1929 |
| 1,930,278 | Marrison | Oct. 10, 1933 |
| 2,303,862 | Peterson | Dec. 1, 1942 |
| 2,676,263 | Hugenholtz et al. | Apr. 20, 1954 |

FOREIGN PATENTS

| | | |
|---|---|---|
| 122,686 | Australia | May 27, 1948 |